United States Patent
Chandel et al.

(10) Patent No.: US 9,292,622 B2
(45) Date of Patent: Mar. 22, 2016

(54) SYSTEMS AND METHODS FOR PROVIDING SEARCH SUGGESTIONS

(71) Applicants: Alok Chandel, Sunnyvale, CA (US); Yongsung Kim, Menlo Park, CA (US)

(72) Inventors: Alok Chandel, Sunnyvale, CA (US); Yongsung Kim, Menlo Park, CA (US)

(73) Assignee: GOOGLE INC., Mountain View, CA (US)

( * ) Notice: Subject to any disclaimer, the term of this patent is extended or adjusted under 35 U.S.C. 154(b) by 65 days.

(21) Appl. No.: 13/728,951

(22) Filed: Dec. 27, 2012

(65) Prior Publication Data

US 2014/0188926 A1 Jul. 3, 2014

(51) Int. Cl.
G06F 7/00 (2006.01)
G06F 17/30 (2006.01)

(52) U.S. Cl.
CPC ...... *G06F 17/3097* (2013.01); *G06F 17/30029* (2013.01)

(58) Field of Classification Search
None
See application file for complete search history.

(56) References Cited

U.S. PATENT DOCUMENTS

| | | | |
|---|---|---|---|
| 5,845,300 A * | 12/1998 | Comer et al. | 715/203 |
| 5,877,759 A * | 3/1999 | Bauer | 719/317 |
| 7,836,044 B2 | 11/2010 | Kamvar et al. | |
| 7,962,504 B1 * | 6/2011 | Mehanna | 707/765 |
| 8,010,523 B2 | 8/2011 | Djabarov | |
| 8,027,974 B2 | 9/2011 | Gibbs | |
| 8,156,109 B2 | 4/2012 | Kamvar et al. | |
| 8,166,029 B2 * | 4/2012 | Park et al. | 707/732 |
| 8,200,205 B2 * | 6/2012 | Ramer et al. | 455/418 |
| 8,271,546 B2 | 9/2012 | Gibbs | |
| 8,601,019 B1 * | 12/2013 | Weininger et al. | 707/769 |
| 2007/0162422 A1 * | 7/2007 | Djabarov | 707/2 |
| 2008/0065617 A1 * | 3/2008 | Burke et al. | 707/5 |
| 2011/0302188 A1 * | 12/2011 | Djabarov | 707/768 |

OTHER PUBLICATIONS

Google Inc., International Search Report and Written Opinion, PCT/US2013/077703, Aug. 7, 2014, 7 pgs.
Google Inc., International Preliminary Report on Patentability, PCT/US2013/077703, Jun. 30, 2015, 6 pgs.

* cited by examiner

*Primary Examiner* — Michael Hicks
(74) *Attorney, Agent, or Firm* — Morgan, Lewis & Bockius LLP

(57) ABSTRACT

Systems and methods for providing search suggestions are disclosed. In some implementations, a method includes: at an electronic device having one or more processors and memory storing one or more programs for execution by the one or more processors: displaying a search field; detecting a predefined user activity relating to the search field over a first predefined period of time; and in response to the detection: displaying one of: (i) a suggested search feature demonstrating syntax of a system-supported user query, or (ii) a suggested search term related to a user's recent viewing activity. In other implementations, the method includes: displaying a search field; detecting user inactivity with respect to the search field over a first predefined period of time; and in response to the detection: displaying, in the search field, a search suggestion demonstrating syntax of a system-supported user query.

17 Claims, 7 Drawing Sheets

SYSTEMS AND METHODS FOR PROVIDING SEARCH SUGGESTIONS

TECHNICAL FIELD

The disclosed implementations relate generally to providing search suggestions.

BACKGROUND

Providing search suggestions to users has become increasingly important. For example, a search provider might want to suggest search keywords related to terms or portions of terms that a user has entered into a search engine user interface, such as search box, or suggest popular searches. The suggestions are often displayed in a pane from which the user can select one of the suggestions. The search engine then performs a search using the search terms. These suggestions are useful in helping a user to select search terms, but they do not help a user to employ advanced search syntax or advanced search features of a search engine in combination with the selected search terms—or to even learn about search syntax and features generally. As a result, most users do not employ advanced search syntax or advanced search features, which, if used, would likely increase the effective use of the search engine capabilities.

The above identified difficulties are reduced or eliminated by the systems and methods disclosed herein.

SUMMARY

Systems, methods, electronic device, and non-transitory computer readable storage mediums for providing search suggestions are hereby disclosed.

In one aspect, a method for providing search suggestions includes: at an electronic device having one or more processors and memory storing one or more programs for execution by the one or more processors: displaying a search field; detecting a predefined user activity relating to the search field over a first predefined period of time; in response to the detection: displaying one of: (i) a suggested search feature demonstrating syntax of a system-supported user query; or (ii) a suggested search term related to a user's recent viewing activity.

In some implementations, the method described above is executed before receiving a user query, and the predefined user activity is user inactivity.

In some implementations, the method further includes: receiving, from the search field, a user query having one or more characters, where the first character of the suggested search feature or the suggested search term is the same as the first character of the user query.

In some implementations, the suggested search feature is displayed in the search field; and the method further comprises: receiving, from the search field, the user query; and displaying, in a suggestion list, the suggested search feature when the first character of the suggested search feature is the same as the first character of the user query.

In some implementations, the suggested search feature is one of: (i) a search feature randomly selected from a plurality of suggested search features, or (ii) a search feature that has not been displayed to the user for a predefined period of time in the past.

In some implementations, the suggested search feature or the suggested search term is selected in accordance with a time, day or date associated with the user query or the user's recent viewing activity. In other implementations, the suggested search feature or the suggested search term is selected in accordance with a search history or a user profile associated with the user.

In some implementations, the suggested search feature is one of: (i) a recently available search feature, (ii) a search feature unknown or infrequently used by the user.

In some implementations, the method also includes: after displaying the suggested search feature: detecting the predefined user activity over a second predefined period of time greater than the first predefined period of time; in response: displaying the suggested search feature again.

In some implementations, the method further includes: displaying, in the suggestion list, one or more additional search terms related to the suggested search term or to the user's recent viewing activity.

In some implementations, the suggested search term relates to media content being currently viewed or viewed within a predefined time period in the past, by the user.

In some implementations, the suggested search term corresponds to one of: an actor/actress associated with the media content, a plot associated with the media content, a trivia associated with the media content, or a genre associated with the media content.

In another aspect, a method for providing search suggestions includes: at an electronic device, displaying a search field; detecting user inactivity with respect to the search field over a first predefined period of time; in response to the detection: displaying, in the search field, a search suggestion demonstrating syntax of a system-supported user query.

In some implementations, the search suggestion is non-actionable. In some implementations, the method also includes: receiving, from the search field, a user query having one or more characters, where the first character of the search suggestion is the same as the first character of the user query.

In some implementations, the method further includes: receiving, from the search field, the user query; and displaying, in a suggestion list, the search suggestion when the first character of the search suggestion is the same as the first character of the user query.

In some implementations, the method also includes: after displaying the search suggestion: detecting user inactivity over a second predefined period of time greater than the first predefined period of time; in response: displaying the search suggestion again.

A computer system, an electronic device, and a non-transitory computer readable storage medium storing one or more programs, which when executed by a computer, cause the computer to perform one or more steps of the above-described methods are also disclosed.

BRIEF DESCRIPTION OF THE DRAWINGS

The implementations disclosed herein are illustrated by way of example, and not by way of limitation, in the figures of the accompanying drawings. Like reference numerals refer to corresponding parts throughout the drawings.

DETAILED DESCRIPTION

The implementations described herein provide techniques for providing search suggestions, such as (i) a search feature demonstrating syntax of a system-supported user query (e.g., an example query including both search terms and Boolean connectors); or (ii) a search term related to a user's recent viewing activity (e.g., names of the main actors in a movie the user is watching on a connected TV). These techniques may significantly increase future search efficiency and enhance users' search experience and familiarity with advanced search engine features and syntax.

In some implementations, an electronic device displays a search field (e.g., a search box) in which a user may enter one or more search terms. The electronic device can be any sort of computer device with an Internet connection and the capability to output information to a display. For example, the electronic device can be a Google TV-enabled device coupled to a TV, a laptop computer, a desktop computer with a display, a smartphone, a tablet computer, or a connected TV that can be programmed to present and allow user interaction with a search box. In some implementations, the electronic device is configured to detect user interactions with the search field and then present information in conjunction with the search field related to those interactions. For example, in some implementations, the electronic device is configured to detect a lack of user interaction with the search field over a first predefined period of time, such as 10 seconds. Then, in response to detecting the user inactivity, the electronic device displays (i) a suggested search feature demonstrating syntax of a system-supported user query, such as a string demonstrating syntax for an advanced or newly-available search feature, or (ii) a suggested search term related to a user's recent viewing activity, such as names of actors or actress in a TV program that the user recently watched (or is watching) on a connected TV or Google TV-enabled device.

In this way, when a user has not yet entered search terms in a search field, search suggestions, such as (i) syntax for an advanced search feature (e.g., using Boolean connectors, such as AND or OR, in conjunction with user-supplied search terms), or (ii) search keywords relevant to media content (e.g. MP3 songs, YouTube videos, or TV or movie episodes) a user is consuming or has recently consumed, are provided to the user. This approach is beneficial, because: (i) when example syntax for advanced search features is demonstrated in a search suggestion, the learning curve for using these advanced search features is likely to be significantly reduced, and (ii) when search terms provided in a search suggestions are relevant to media content in which a user has expressed interest, by following the search suggestion, the user is likely to receive search results of interest.

Additional details of implementations are now described in relation to the Figures.

Figure 1:
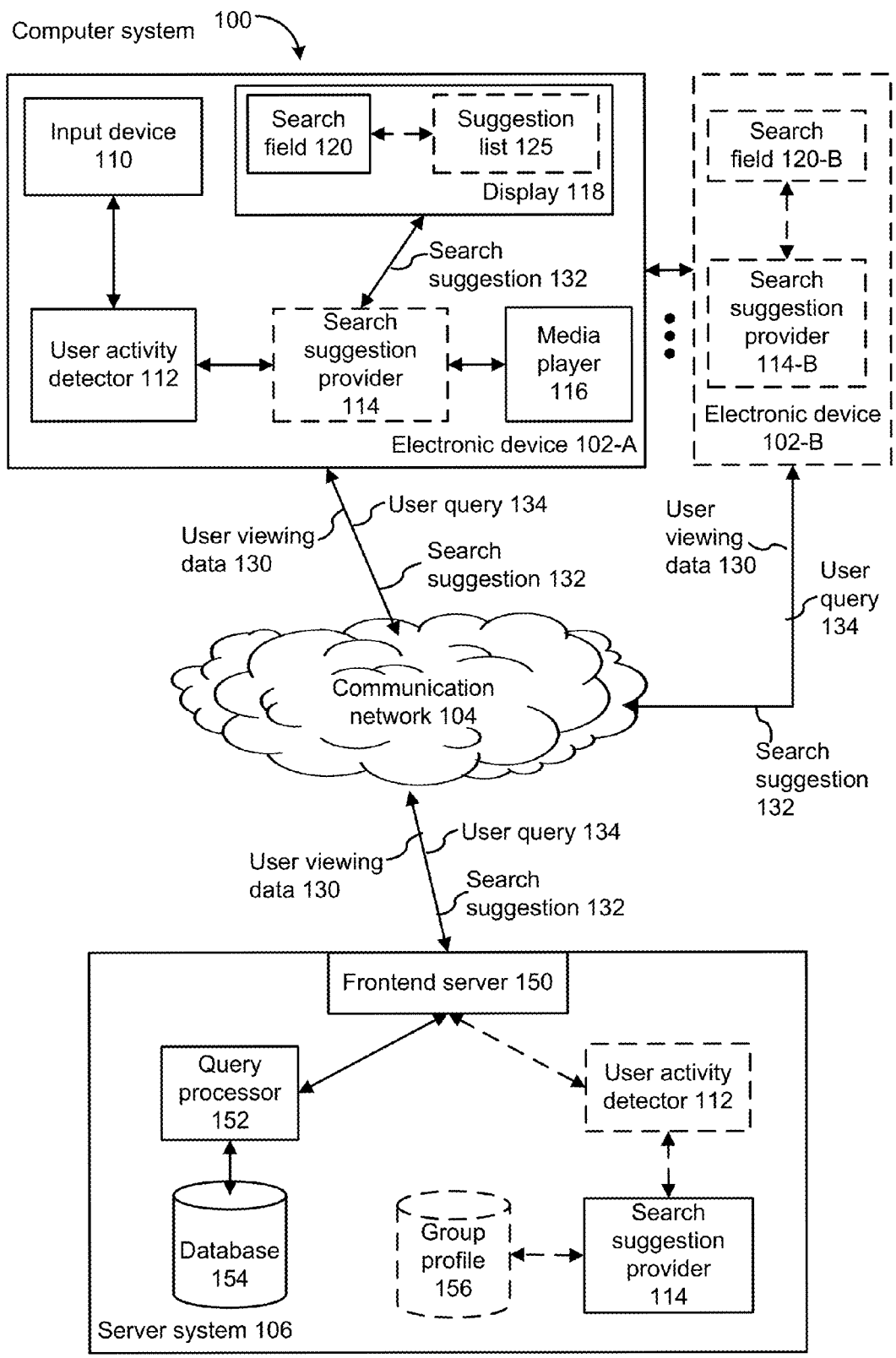
FIG. 1 is a block diagram illustrating a computer system, in accordance with some implementations.

FIG. 1 is a block diagram illustrating a computer system 100 for providing search suggestions. In some implementations, the computer system 100 includes one or more electronic devices 102 ("electronic device 102"). The electronic device 102 can be a connected TV (i.e., a TV with Internet connectivity that can execute applications on a Google TV-enabled device, or any computer system configured to display a search box and execute one or more program modules to enable user interaction with the search box). The computer system 100 also includes a communication network 104, and a server system 106 ("server 106"). In some implementations, the computer system 100 includes two or more electronic devices 102 (e.g., electronic device 102-A and electronic device 102-B).

In some implementations, the electronic device 102 receives search suggestion 132 from the server 106, and displays the search suggestion 132, or a portion thereof, to a user. In some implementations, the electronic device 102 also collects and sends user viewing data 130 to the server 106 that reports on media content recently viewed by a user. Based on this viewing data 130 the server 106 generates search suggestions 132. The server can also generate search suggestions 132 in light of viewing activities for a group of users (e.g., two or more users having a same common interest).

In some implementations, the electronic device 102 includes an input device 110, a user activity detector 112, optionally a search suggestion provider 114, a media player 116 and a display 118. In some implementations, the input device 110 (e.g., a keyboard, a mouse, a touchpad, or a touchscreen) receives input from a user, such as search terms entered by the user, or mouse movement by the user (e.g., a mouse over or a click). In some implementations, the user activity detector 112 detects user activities or lack thereof (e.g., user inactivity), for example whether the user has moved mouse cursor in the past 10 seconds, what character(s) the user is entering or has entered in a search field 120, or whether the user is viewing or has recently viewed media content (e.g., on the media player 116). In some implementations, the search suggestion provider 114 provides one or more search suggestions (e.g., a suggested search feature or a suggested search term), and displays the search suggestions, or a subset thereof, in the search field 120 or in a suggestion list 125. In some implementations, the media player 116 displays media content for a user to consume (e.g., view or listen). In some implementations, the media player 116 includes a stand-alone device (e.g., a DVD, CD or BlueRay player). In other implementations, the media player 116 includes a software package for displaying media content (e.g., a web-browser plug-in for playing YouTube audio/video). In some implementations, the display 118 includes a computer monitor or a TV screen (e.g., a Google TV screen). In some implementations, the displays 118 displays to a user the search field 120 and optionally the suggestion list 125.

In some implementations, the communication network 104 optionally includes the Internet, one or more local area networks (LANs), one or more wide area networks (WANs), other types of networks, or a combination of such networks.

In some implementations, the server 106 includes a front end server 150, a query processor 152, a database 154, a group profile 156 (optional), the user activities detector 112 (optional), and the search suggetion provider 114 (optional). In some implementations, the front end server 150 receives information identifying user activities on the electronic device 102 (e.g., user viewing data 130), and transmits the information to the user activity detector 112 on the server 106 for analysis. In some implementations, after search suggestions are provided, a user enters a user query 134; and the frontend server 150 receives the user query 134 and transmits it to the query processor 152 for execution. In some implementations, after receiving the user query 134, the query processor 152 executes the user query 134 against the database 154, collects search results returned in accordance therewith, and transmits the search results back to the electronic device 102 (e.g., via the frontend server 150). In some implementations, the database 154 stores document (e.g., web pages), data, information, or indices thereof, such as, names of movies or TV episodes related to (e.g., having the same genre as) a movie a user is watching or has recently watched. In some implementations, the group profile 156 stores information concerning a group of users or electronic devices 102. In some implementations, the group profile 156 includes search statistics derived from user queries 134 submitted by a group of users, search suggestions previously provided to a group of users, and user feedback therefor (implicit or explicit). In some implementations, the user feedback includes: whether a search suggestion is adopted by a user, frequencies thereof, or relationship (or lack thereof) between a provided search suggestion and query term(s) subsequently entered by a user. In some implementations, the group profile 156 also includes group viewing data 316 and group suggestion statistics 318 (see FIG. 3). In some implementations, the user activity detector 112 resides on the server 106. In some implementations, the search suggestion provider 114 provides search suggestions to the electronic device 102, in accordance with the user viewing data 130 or the group profile 156. In other implementations, the user activity detector 112 resides on the electronic device 102. In still other implementations, the user activity detector 112 resides on both the server 106 and the electronic device 102.

Figure 2:
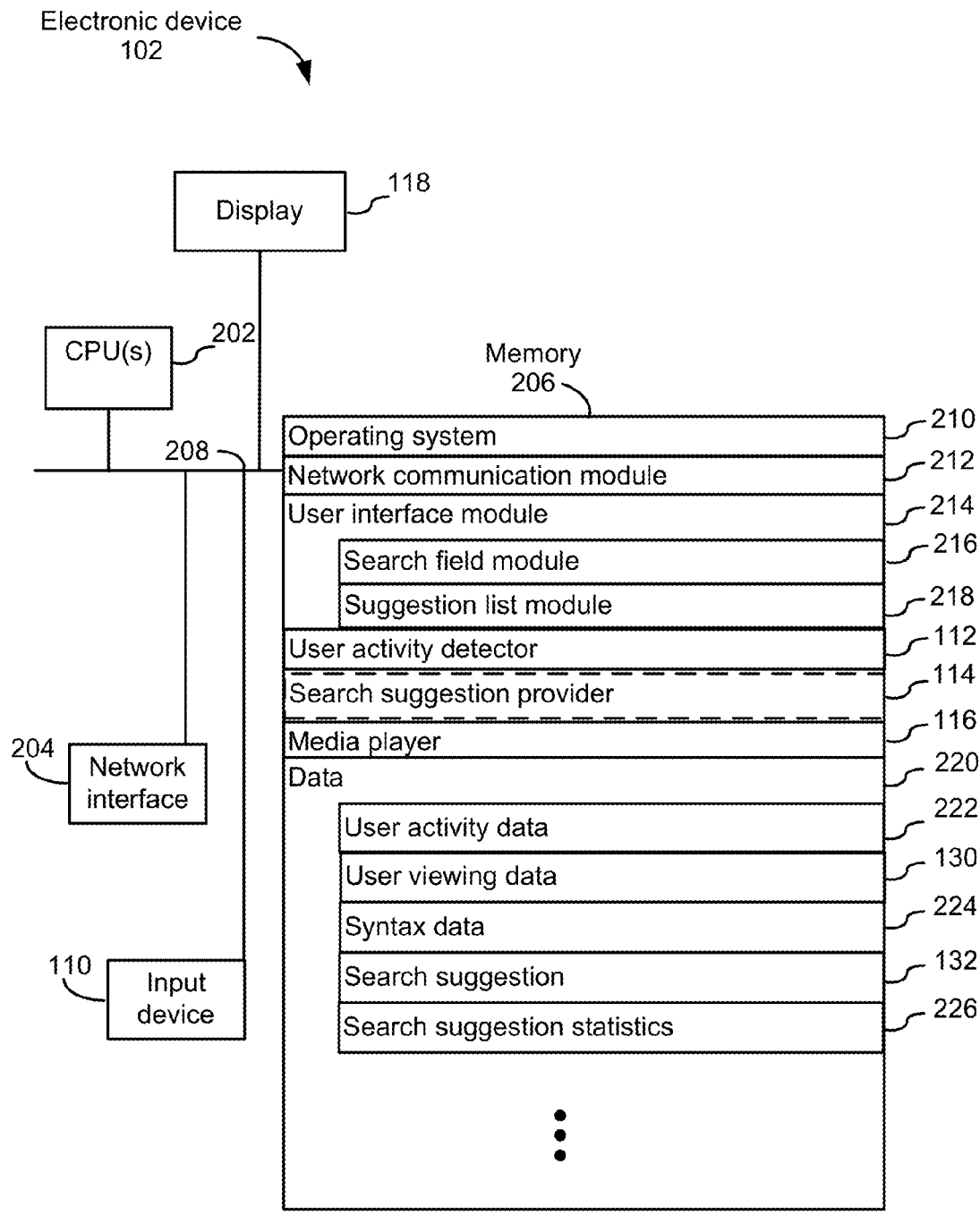
FIG. 2 is a block diagram illustrating an electronic device, in accordance with some implementations.

FIG. 2 is a block diagram illustrating a electronic device 102 ("electronic device 102") in accordance with some implementations. The electronic device 102, in some implementations, includes one or more processing units CPU(s) 202 (also herein referred to as processors), one or more network interfaces 204, memory 206, the input device 110 (e.g., a keyboard, a mouse, a touchpad, or a touchscreen), the display 118, and one or more communication buses 208 for interconnecting these components. The communication buses 208 optionally include circuitry (sometimes called a chipset) that interconnects and controls communications between system components. The memory 206 typically includes high-speed random access memory, such as DRAM, SRAM, DDR RAM or other random access solid state memory devices; and optionally includes non-volatile memory, such as one or more magnetic disk storage devices, optical disk storage devices, flash memory devices, or other non-volatile solid state storage devices. The memory 206 optionally includes one or more storage devices remotely located from the CPU(s) 201. The memory 206, or alternatively the non-volatile memory device(s) within the memory 206, comprises a non-transitory computer readable storage medium. In some implementations, the memory 206 or alternatively the non-transitory computer readable storage medium stores the following programs, modules and data structures, or a subset thereof:

- an operating system 210, which includes procedures for handling various basic system services and for performing hardware dependent tasks;
- a network communication module (or instructions) 212 for connecting the electronic device 102 with other devices (e.g., the server 106 or other electronic devices 102) via one or more network interfaces 204 (wired or wireless), or the communication network 104 (FIG. 1);
- a user interface module 214 for displaying user interface components or controls (e.g., textboxes, buttons, radio buttons, drop-down lists) to a user, which includes:
  - a search field module 216 for selectively displaying search suggestions in the search field 120, and gathering user input (e.g., search keywords as part of a user query) from the search field 120 (e.g., on a character by character or word by word basis); and
  - a suggestion list module 218 for displaying the suggestions list 125 (e.g., a drop-down list), and contemporaneously updating the suggestions list 125 in accordance with user input;
- a user activity detector 112 for detecting predefined user activities or user inactivities on the electronic device 102 (e.g., whether a user has entered any search keywords, or whether the user has moved mouse cursor in the past 10 seconds);
- optionally, a search suggestion provider 114 for providing one or more search suggestions to the search field module 216 or to the suggestion list module 218;
- a media player 116 (hardware or software) for playing media content (e.g., TV episodes, MP3 songs, YouTube streams, or movies) on the electronic device 102; and
- data 220 stored on the electronic device 102, which include:
  - user activity data 222 for including information relating to user activities or inactivity on the electronic device 102, such as for how long the user has been idling (e.g., no keyboard stroke or mouse movement);
  - user viewing data 130 for including information relating to a user's viewing activity on the electronic device 102, for example, name, genre, year, or title of a movie watched by a user on a specific day, or how frequently a user watches cartoon movies;
  - syntax data 224 for including syntax of system-supported user queries, such as: a user query may not begin with a reserved keyword (e.g., "AND"), or using quotation marks around a search term indicates an exact match (between the search term and search results) is desired;
  - search suggestion 132 for including search suggestions—such as, (i) a suggested search feature demonstrating syntax of a system-supported user query; or (ii) a suggested search term related to a user's recent viewing activity—to be provided to a user; and
  - search suggestion statistics 226 for including statistics relating to search suggestions 132, such as whether or when a particular search suggestion has been displayed to a user in the past 3 hours, or whether a user has adopted a search suggestion (by subsequently executing queries with keywords similar to those provided in the search suggestion).

In some implementations, the electronic device 102 also includes the display 118, media content input/output, and a TV remote control. In some implementations, the display 118 includes a TV screen or a computer monitor. In some implementations, the TV remote control adjusts (e.g., fast-forward or -backward) media content being displayed on the electronic device 102 (e.g., via the media player 116).

In some implementations, the distributed client-server system 100 includes two or more electronic devices 102 (e.g., electronic device 102-A and electronic device 102-B). In some implementations, the search provider 114 on the server 106 communicates with one or more electronic devices 102. In some implementations, the search suggestion provider 114 on the server 106 provides search suggestions 132 to and collects search suggestion statistics 226 from both the electronic device 102-A and the electronic device 102-B when the electronic device 102-A and the electronic device 102-B share a predefined relationship and users of the respective computers have given permission to the collection of such search statistics (e.g., two computers owned by a same user or within a same range of IP address, or users of the electronic device 102-A and the electronic device 102-B are family members, belong to a same social circle, or share a common interest).

In some implementations, one or more of the above identified elements are stored in one or more of the previously mentioned memory devices, and correspond to a set of instructions for performing a function described above. The above identified modules or programs (e.g., sets of instructions) need not be implemented as separate software programs, procedures or modules, and thus various subsets of these modules may be combined or otherwise re-arranged in various implementations. In some implementations, the memory 206 optionally stores a subset of the modules and data structures identified above. Furthermore, the memory 206 may store additional modules and data structures not described above.

Figure 3:
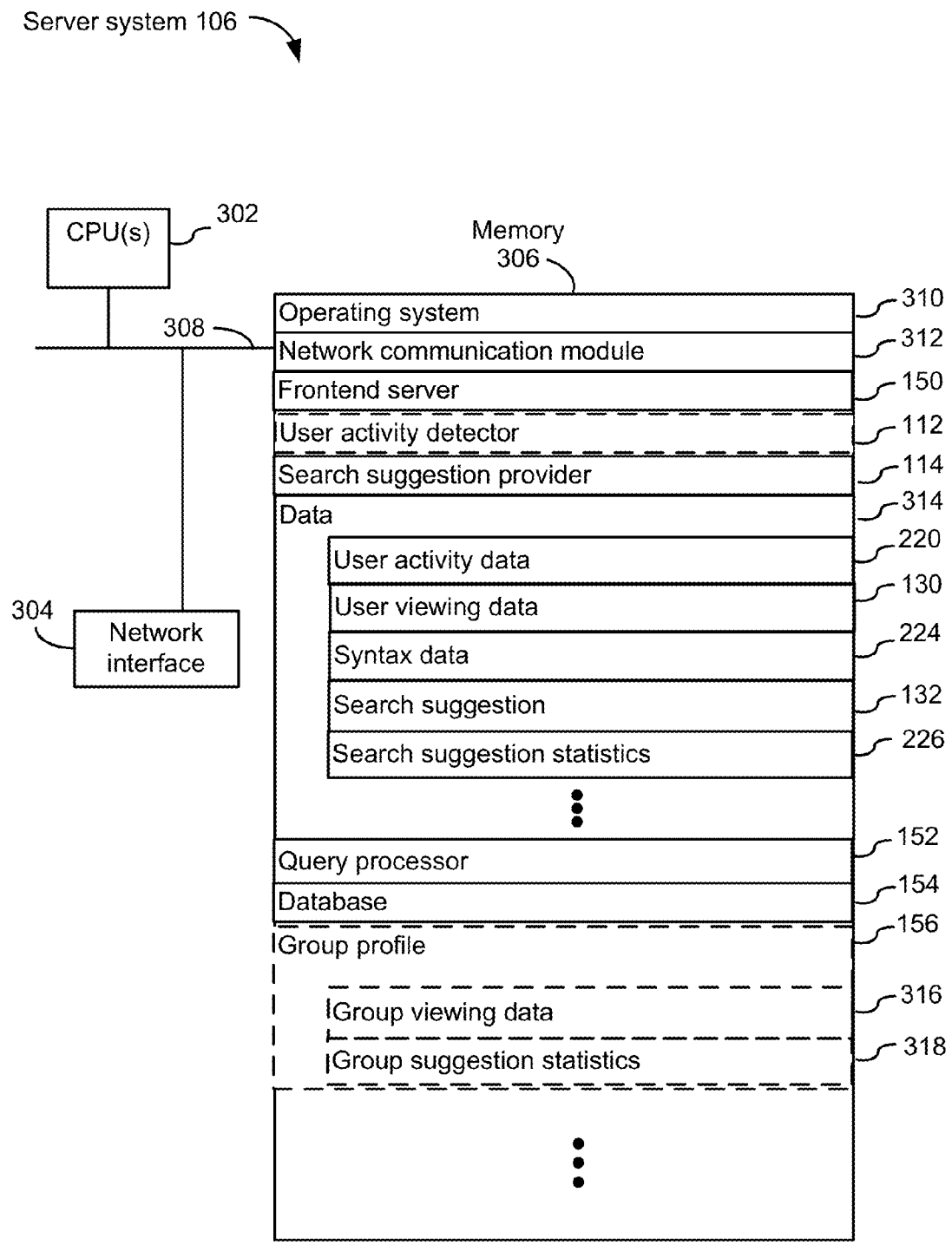
FIG. 3 is a block diagram illustrating a server system, in accordance with some implementations.

FIG. 3 is a block diagram illustrating the server system 106 ("server 106," also called a server), in accordance with some implementations. The server 106 typically includes one or more processing units CPU(s) 302 (also herein referred to as processors), one or more network interfaces 304, memory 306, and one or more communication buses 308 for interconnecting these components. The communication buses 308 optionally include circuitry (sometimes called a chipset) that interconnects and controls communications between system components. The memory 306 includes high-speed random access memory, such as DRAM, SRAM, DDR RAM or other random access solid state memory devices; and optionally includes non-volatile memory, such as one or more magnetic disk storage devices, optical disk storage devices, flash memory devices, or other non-volatile solid state storage devices. The memory 306 optionally includes one or more storage devices remotely located from CPU(s) 302. The memory 306, or alternatively the non-volatile memory device(s) within the memory 306, comprises a non-transitory computer readable storage medium. In some implementations, the memory 306 or alternatively the non-transitory computer readable storage medium stores the following programs, modules and data structures, or a subset thereof:

- an operating system 310, which includes procedures for handling various basic system services and for performing hardware dependent tasks;
- a network communication module (or instructions) 312 for connecting the server 106 with other devices (e.g., one or more electronic devices 102) via the one or more network interfaces 304 (wired or wireless), or the communication network 104 (FIG. 1);
- a frontend server 150 for receiving and transmitting data concerning user activities (e.g., user viewing data 130) received from the electronic device 102, to the user activity detector 112 (on the server 106); and for transmitting a user query 134 received from the electronic device 102 to the query processor 152;
- a query processor 152 for executing user queries received from the electronic device 102 (e.g., user queries 134), for collecting search results returned in accordance therewith, and for transmitting the search results to one or more electronic devices 102;
- a database 154 for including data (e.g., web pages or other documents), or indices thereof, such as, information about movies or TV episodes similar to a movie a user is watching or has recently watched;
- a group profile 156 for including information concerning a group of users or electronic devices 102, which includes:
  group viewing data 316 for including information concerning viewing activities by a group of users, such as names, genre, year, or title of movies or music consumed by a group of users in the past week; and
  group suggestion statistics 318 for including statistics concerning search suggestions provided to a group of users, such as, search suggestions provided to the group of users in past 3 days, and user feedback therefor.

In some implementations, one or more of the above identified elements are stored in one or more of the previously mentioned memory devices and correspond to a set of instructions for performing a function described above. The above identified modules or programs (e.g., sets of instructions) need not be implemented as separate software programs, procedures or modules, and thus various subsets of these modules may be combined or otherwise re-arranged in various implementations. In some implementations, the memory 306 optionally stores a subset of the modules and data structures identified above. Furthermore, the memory 306 optionally stores additional modules and data structures not described above.

Although FIG. 3 shows a "server system 106," also referred to as a server, FIG. 3 is intended more as functional description of the various features which may be present in server system than as a structural schematic of the implementations described herein. In practice, and as recognized by those of ordinary skill in the art, items shown separately could be combined and some items could be separated.

Figure 4:
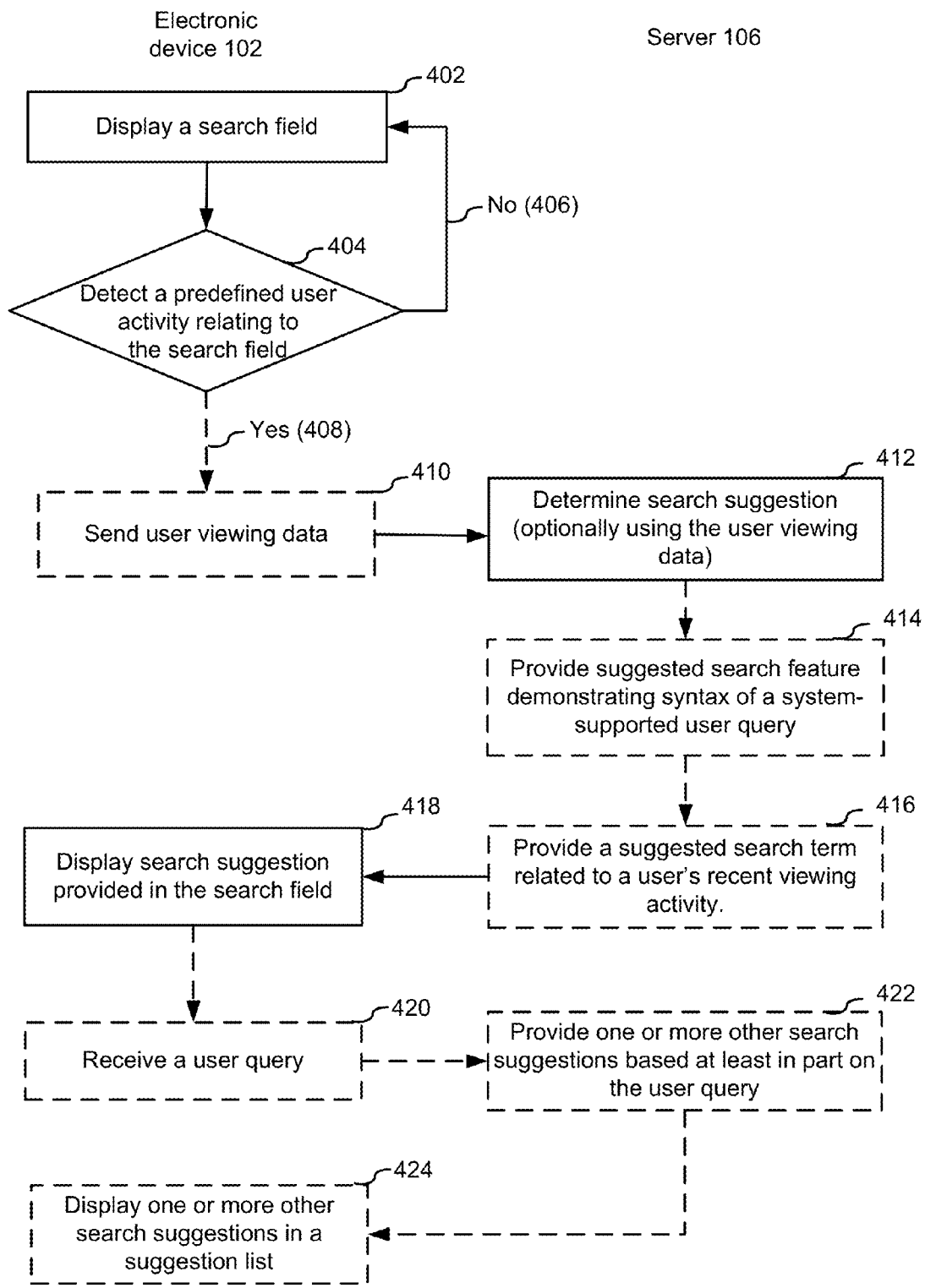
FIG. 4 is a flow chart illustrating a method for providing search suggestions in a computer system, in accordance with some implementations.

FIG. 4 is a flow chart illustrating a method 400 for providing search suggestions in a computer system, in accordance with some implementations.

In some implementations, the electronic device 102 first displays (502) a search field (e.g., the search field 120 in FIG. 1). In some implementations, the search field is a text box in which a user can enter one or more search keywords (or search terms). In some implementations, the search field is a search box displayed on Google's "google.com" website or a search box on a Google TV or other application. In some implementations, the electronic device 102 detects user input in the search field and transmits the user input to the server 106, on a character-by-character or a word-by-word basis. In other implementations, the electronic device 102 detects user input in the search field and transmits the user input to the server 106, after a predefined event. For example, the electronic device 102 begins to transmit keywords in the search field after detecting a long pause (e.g., no further user input within 10 seconds).

In some implementations, after displaying (402) the search field, the electronic device 102 detects (404) a predefined user activity relating to the search field. In some implementations, the predefined user activity includes: (i) whether a user has hovered his or her mouse over the search field for more than 10 seconds, (ii) whether a user has entered any character or word in the search field or not, in the past 5 seconds, or (iii) whether a user has clicked another user interface control (e.g., a refresh button in another web browser) after setting focus on the search field, suggesting that the user has shifted attention away from the search field. In some implementations, the predefined user activity is user inactivity (e.g., a lack of user activity) relating to the search field. For example, the search field still has user focus, but the user has not entered any search terms or keywords in the search field, in the past 10 seconds.

In some implementations, if a predefined user activity relating to the search field is not detected ("No" 406)—for example, if the predefined user activity is user inactivity with respect to the search field, but a user has entered one or more search terms in the search field—the electronic device 102 restarts the detection cycle (e.g., going back to the step 402). In some implementations, detecting predefined user activity involves detecting user activity over a predefined period of time (e.g., whether a user has not moved mouse cursor for the past 10 seconds), and restarting the detection cycle includes resetting or restarting the predefined period of time.

In some implementations, if the predefined user activity relating to the search field is detected ("Yes" 408)—for example, if the electronic device 102 detects user inactivity over the past 10 second, and a user has not entered a search terms in the search field over that period of time—this determination (e.g., that the user is inactive) is transmitted to the server 106, where one or more search suggestion are then provided to the user.

In some implementations, after the predefined user activity relating to the search field is detected ("Yes" 408), the electronic device 102 also sends (410) user viewing data 130 (e.g., the title of a movie being displayed on the electronic device 102) to the server 106.

In some implementations, after the predefined user activity relating to the search field is detected, the server 106 determines (412) one or more search suggestions (e.g., search suggestions 132) to be provided to the electronic device 102. In some implementations, the search suggestions are determined in accordance with the user viewing data 130. For example, in some implementations, search suggestions are provided to the electronic device 102, based on information identifying media content being consumed or has recently been consumed by a user of the electronic device 102. For example, in some situations, when a user has recently watched 3 or more CSI-Miami episodes, search suggestions provided by the server 106 include names of main actors in those episodes, or titles of similar TV series (e.g., CSI-NYC, Law and Order, or Criminal Minds).

In some implementations, to educate a user about a search feature, the server 106 provides (414) a suggested search feature demonstrating syntax of a system-supported user query. For example, the server 106 provides a search suggestion, such as "crime movie AND (before 1980 OR after 2011)," to demonstrate a possible syntax for using Boolean connectors (e.g., "AND" and "OR") in conjunction with user-supplied key words (e.g., "crime movie," "before 1980," and "after 2011"). In some implementations, a suggested search feature includes keywords recently submitted by a user (e.g., the user has searched "crime movie" 3 hours ago), so as to attract user attention and to encourage user action. In some implementations, complexity of a suggested search features is determined in accordance with a profile associated with a user (e.g., Google account information identifying the user as a computer scientist), or the group profile 156 (which, for example, identifies the user as an active member of a prominent computer programming discussion group). In some implementations, the user profile or the group profile 156 includes privacy setting, by which a user grants or refuses access to information identifying the user to a third party. This approach—providing suggested search feature demonstrating syntax of a system-supported user query—is beneficial, because it might reduce learn curve associated a newly-available or advanced search feature, which in turn encourage users to learn and use these features.

In other implementations, to help a user to locate information (e.g., other media content) relating to media content the user is consuming or has recently consumed, the server 106 provides (416) one or more suggested search terms (or search keywords) related to the user's viewing activity. For example, in some situations, suggested search terms include titles of movies related to a TV episode a user watched during a browsing session 2 hours ago, or names of actors or actresses from a movie the user is currently watching on the media player 116 (e.g., a YouTube video in a Google Chrome browser). This approach—providing suggested search terms related to a user's viewing activity—is also beneficial, because it might increase likelihood that a user succeeds in finding information relevant to media content he or she is interested in.

In some implementations, after one or more search suggestions are provided, the electronic device 102 displays (418) the search suggestions, or a subset thereof. In some implementations, as shown in FIG. 6B, a search suggestion, such as a search feature demonstrating syntax of a system-supported user query, is displayed in the search field 120 in a visually distinctive manner (e.g., in a greyed-out format) or in a non-executable manner (e.g., a user cannot execute the search suggestion directly, as the user would a user query). In some implementations, as shown in FIG. 6C, a search suggestion, such as suggested search terms related to the user's viewing activity, is displayed, in the suggestion list 125.

In some implementations, after the search suggestions are displayed, the electronic device 102 receives (420) a user query 134 (e.g., a query having search keywords identical or similar to a search suggestion provided), and sends the user query 134 to the server 106 for execution.

In some implementations, after receiving the user query, the server 106 generates feedback data concerning the search suggestions provided. For example, if a user query includes search keyword identical or similar to those included in a search suggestion, the feedback data includes information indicating that the search suggestion is a "good" suggestion, which, in some implementations, results in more similar suggestions being provided. For another example, if the user query does not include a predefined number of terms similar to those included in a search suggestion (e.g., the user query does not include any Boolean connectors, although the search suggestion includes 2 or 3 Boolean connectors), the feedback data includes information indicating that the search suggestion is a "bad" suggestion, which, in some implementations, results in a decrease of similar suggestions being provided.

In some implementations, the server 106 provides (422) one or more further suggestions based at least in part on the user query received in step 420, or the feedback data. In some implementations, the electronic device 102 displays (424) the one or more further suggestions generated by the server 106, or a subset thereof.

Figure 5A:
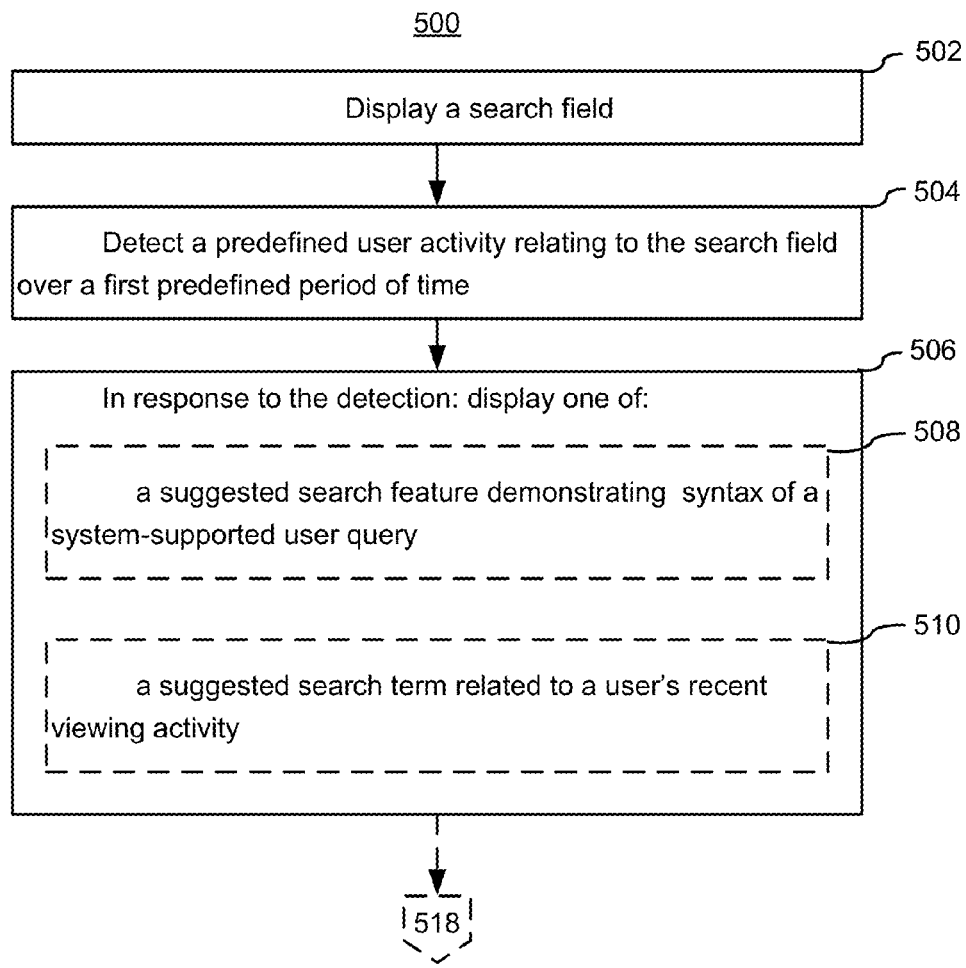
FIGS. 5A-5C are flow charts illustrating methods for providing search suggestions at an electronic device, in accordance with some implementations.
Figure 5B:
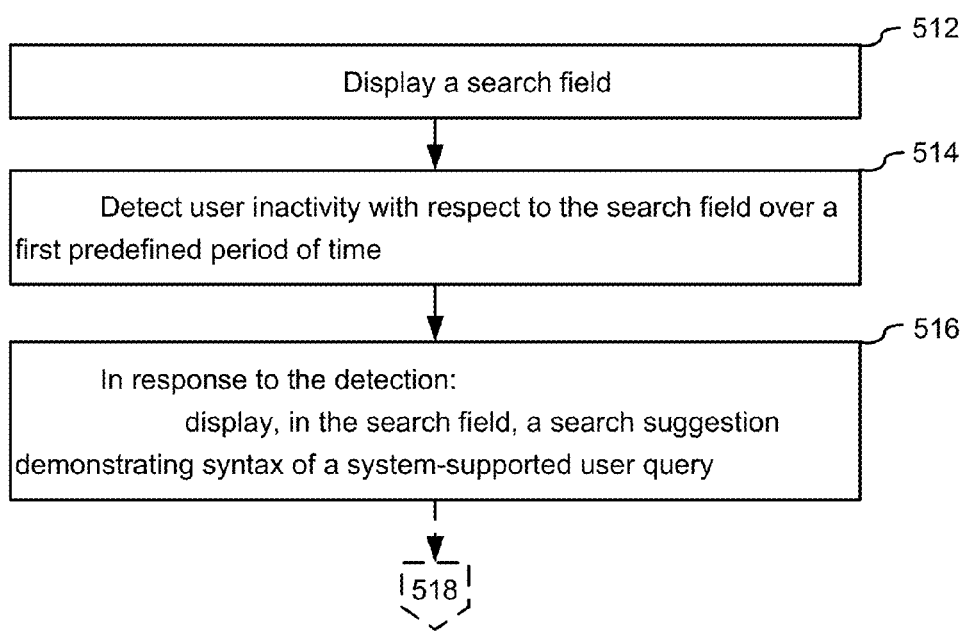
Figure 5C:
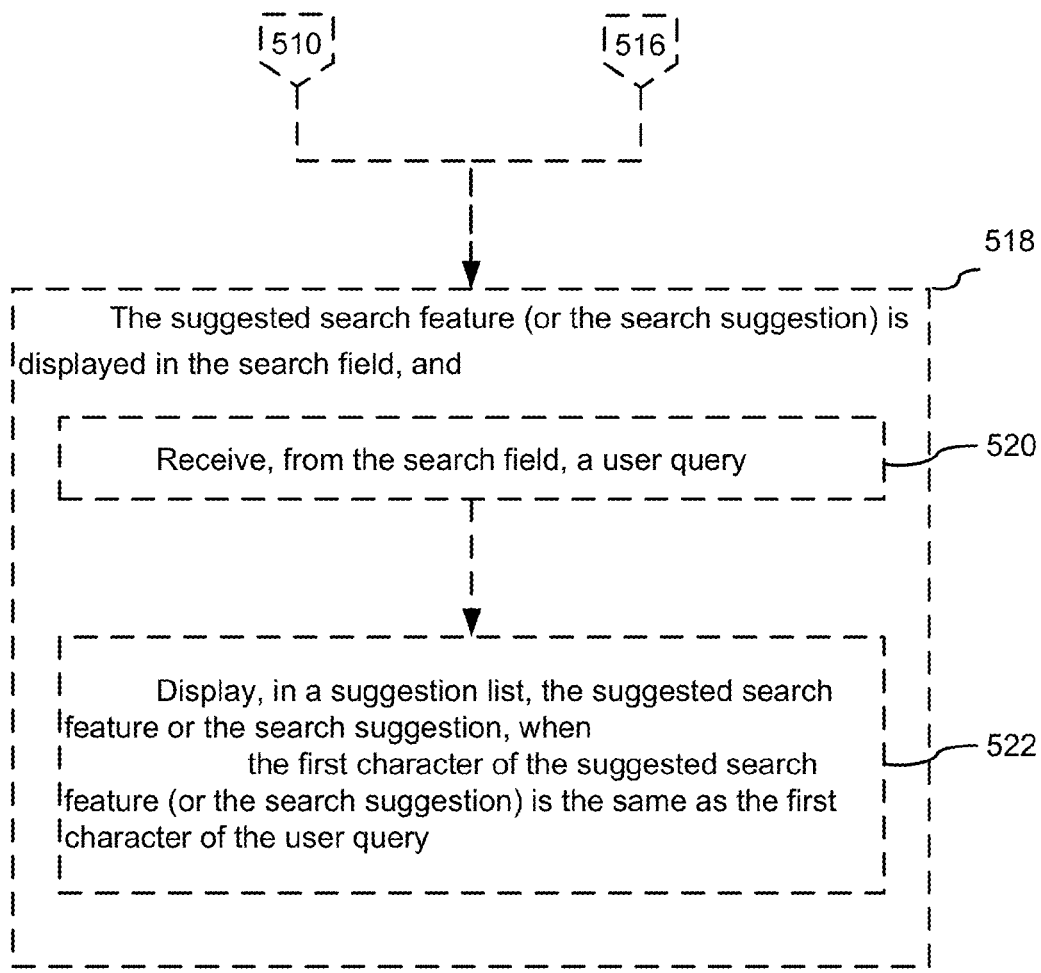

FIGS. 5A-5C are example flow charts illustrating methods 500 for providing search suggestions at an electronic device, in accordance with some implementations.

In some implementations (steps 502-510), the electronic device 102 first displays (502) a search field (e.g., a search box on Google TV or a search box on Google's search engine). In some implementations, the electronic device 102 detects (504) a predefined user activity relating to the search field over a first predefined period of time. In some implementations, in response to (506) the detection, the electronic device 102 displays (506) one of: (i) a suggested search feature demonstrating syntax of a system-supported user query (508), or (ii) a suggested search term related to a user's recent viewing activity (510).

In other implementations (steps 512-516), the electronic device 102 first display (512) a search field. In some implementations, the electronic device 102 then detects (512) user inactivity with respect to the search field over a first predefined period of time (e.g., a user has not moved mouse cursor in the past 10 seconds). In some implementations, in response to the detection: the electronic device 102 display (516), in the search field, a search suggestion (e.g., a suggested search feature) demonstrating syntax of a system-supported user query.

In some implementations, search suggestions (e.g., a suggested search feature or suggested search terms) are non-actionable (e.g., non-executable). For example, a search suggestion is displayed as grey-out text, and cannot be executed by a user directly without further user input (e.g., a user click on the search suggestion). In some implementations, a non-actionable search suggestion becomes actionable (e.g., executable) after a user enters the first character or word of the search suggestion.

In some implementations, the steps described in (steps 502-510 or steps 512-514) are executed before receiving a user query (e.g., a user has not begun a search by entering any search term yet), and the predefined user activity is user inactivity (e.g., the user has not moved mouse cursor in the past 10 second). In some implementations, therefore, the suggested search feature provided in step (508) or the suggested search term(s) provided in step (510) are displayed to the user before the user has entered any search terms. This approach is beneficial because it reduces burden for beginning a search, even if a user is not certain as to what search terms are appropriate.

In some implementations, after displaying (i) the suggested search feature (see FIG. 6B) or (ii) the suggested search term (see FIG. 6C), the electronic device 102 also receives, from the search field, a user query having one or more character, and the first character of the suggested search feature or the suggested search term is the same as the first character of the user query. For example, after the electronic device 102 displays a suggested search feature in the search field 120 or a suggested search term in the suggestion list 125, a user, following the search suggestion (e.g., the suggested search feature or term), begins to enter a user query in the search field 120. In some implementations, a user follows a provided search suggestion (e.g., suggested search feature or term) by typing (e.g., character by character) the provided search suggestion in the search field 120. In some implementations, when the first character of the user query is the same as the first character of the search suggestion (e.g., suggesting that the user is following the search suggestion), the electronic device 102 continues to display the search suggestion (e.g., in the suggestion list 125) to the user so as to provide continuous guidance. In some implementation, when the user query starts to deviate from or fails to bear a predefined degree of resemblance to a search suggestion (suggesting that the user is not following the search suggestion), the electronic device 102 discontinue the display of the search suggestion so as to minimize potential disruption to the user.

In other implementations, after displaying (518) a suggested search feature in the search field 120 (see FIG. 6B), the electronic device 102 receives (520), from the search field 120, a user query having one or more characters. In some implementations, when the first character of the user query is the same as the first character of the search suggestion (e.g., suggesting a user is attempting to enter the suggested search feature in the search field 120), the electronic device 102 stops displaying the suggested search feature in the search field 120 (where the user is entering the user query), but instead, displays (522) the suggested search feature, in a suggestion list (e.g., the suggestion list 125) positioned below (or adjacent to) the search field. For example, after displaying a non-executable suggested search feature (e.g., "romantic comedies with tom hanks") in the search field 120 (see FIG. 6B), the electronic device 102 receives a user query having one or more characters (e.g., "romance movie AND Tom Hanks").

In some implementations, when the first character of the user query (e.g., the letter "r" in "romance movie AND Tom Hanks") is the same as the first character of the suggested search feature (e.g., the letter "r" in "romantic comedies with tom hanks"), the electronic device 102 stops displaying the suggested search feature in the search field 12, but instead, displays the suggested search feature in the suggestion list 125 positioned below the search field 120, as the user continues to enter other characters of the user query. Once it is displayed in the suggestion list 125, the suggested search feature can be selected for execution by the user. In some implementations, when the user query (e.g., "rome holiday schedules") does not match or bear a predefined degree of resemblance with the suggested search feature (e.g., "romantic comedies with tom hanks"), the electronic device 102 discontinues the display of the suggested search feature. This approach allows the continuous display of a suggested search feature if there is an indication that a user is following the suggested search feature, providing continuous guidance to the user.

In some implementations, the suggested search feature is (i) a search feature randomly or pseudo-randomly selected from a plurality of suggested search features (e.g., a pool of predefined search suggestions). In some implementations, the suggested search feature is a search feature that has not been displayed to the user for a predefined period of time in the past. For example, the suggested search feature is a search feature that has not been displayed to a user ever before, or has not been displayed to the user for the past 5 days. This approach is beneficial because repeatedly displaying a same search feature to a same user might result in user frustration.

In some implementations, the suggested search feature or the suggested search term is selected in accordance with a time, day or date associated with the user query or the user's recent viewing activity. For example, during 9 am to 5 pm when a user is likely to be at work, search suggestions (e.g., suggested search feature or suggested search term) related to the user's profession or employment are displayed or given preferences; and after 7 pm when a user is likely to be at home, search suggestions (e.g., suggested search feature or suggested search term) related to the user's personal life (e.g., favorite movies or news) are displayed or given preferences.

In some implementations, the suggested search feature or term is selected in accordance with a search history. For example, if a search history indicates that a user is computer savvy (e.g., has extensive computer skills), advanced search features (e.g., search features involving Boolean connectors or complex syntax) are selected and displayed to the user. For another example, if a search history indicates that a user is not computer savvy (e.g., has only limited computer skills), rudimentary search features (e.g., search features involving at most 1 Boolean connector, or relatively simple syntax) are selected and displayed to the user.

In some implementations, the suggested search feature or term is selected in accordance with a user profile associated with the user. For example, if a user profile (e.g., a user profile associated with a Google or YouTube account) indicates that a user is computer savvy (e.g., a software engineer or a Ph.D student in information management) or has extensive computer skills (e.g., having one or more certifications in different computer programming languages), advanced search features (e.g., search features involving Boolean connectors or complex syntax) or sophisticated search terms (e.g., graduate level vocabulary) are selected and displayed to the user. For another example, if a user profile indicates that a user is not computer savvy (e.g., the user is an elementary school student) or has only limited computer skills (e.g., the user has not received any computer training), rudimentary search features (e.g., search features involving at most 1 Boolean connector, or relatively simple syntax) or unsophisticated search terms (e.g., grade school vocabulary) are selected and displayed to the user.

In some implementations, the suggested search feature is a recently available search feature. For example, the suggested search feature is a functionality that has only been recently released into production, thus became available to users only within the past month. In some implementations, the suggested search feature is a search feature unknown or infrequently used by a user. For example, the suggested search feature involves applying parenthesis around user-supplied search terms, which has long been made available but for various reasons (e.g., learning curve or unfamiliarity) has never been used by or known to a user. These approaches are beneficial because they selectively promote search features (e.g., newly available search features, or search features little known or used) that can potentially significantly increase search efficiency, and reduces learn curve for mastering new or infrequently-used search features.

In some implementations, after displaying the search suggestion, the electronic device 102 detects the predefined user activity over a second predefined period of time greater than the first predefined period of time, and in response: displays the search suggestion again. In some implementations, the predefined user activity is user inactivity. For example, after detecting user inactivity for 5 seconds for the first time, the electronic device 102 displays in the search field 120, a search suggestion demonstrating using Boolean connectors in conjunction with user-supplied search terms. After this search suggestion is displayed, however, the electronic device 102 does not displays this same suggestion again until after detecting a longer period of user inactivity (e.g., for 10 seconds). This approach is beneficial because it avoids repeatedly displaying a same search feature and thus reduces user frustration.

In some implementations, the electronic device 102 displays, in the suggestion list 125, one or more additional search terms related to the suggested search term or to the user's recent viewing activity. For example, as shown in FIG. 6C, in addition to the search term "Lost bloopers and trivia," the electronic device 102 displays two additional related search terms: "evangeline lily," and "dharma initiative."

In some implementations, the suggested search term relates to media content being currently viewed or viewed within a predefined time period in the past, by the user. For example, when a user is watching a Law and Order episode, the suggested search terms might include "Sam Waterston," the name of the Assistant District Attorney in Law and Order episodes. For example, when a user has watched a CSI-Miami episode in the past 2 days, the suggested search terms might include "David Caruso," the name of the lead detective in CSI-Miami episodes.

In some implementations, the suggested search term corresponds to one of: an actor/actress associated with the media content (Sam Waterston in a Law and Order episode), a plot associated with the media content (e.g., murder for hire or DNA matching), a trivia associated with the media content (e.g., a place where a TV episode is filmed), or a genre associated with the media content (e.g., crime, suspense, or horror).

Figure 6A:
FIGS. 6A-6C are screen images illustrating example portions of a user interface for providing search suggestions, in accordance with some implementations.
Figure 6B:
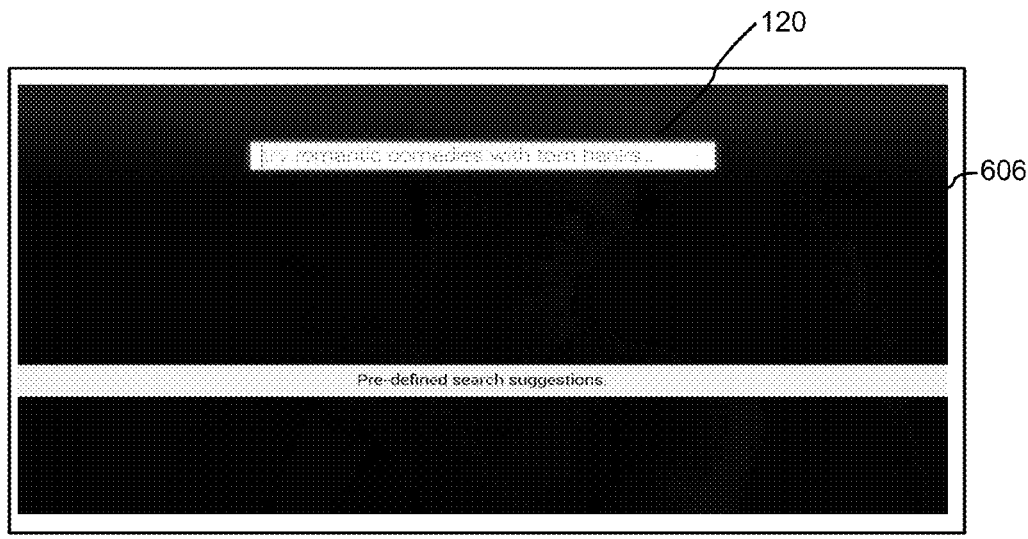
Figure 6C:
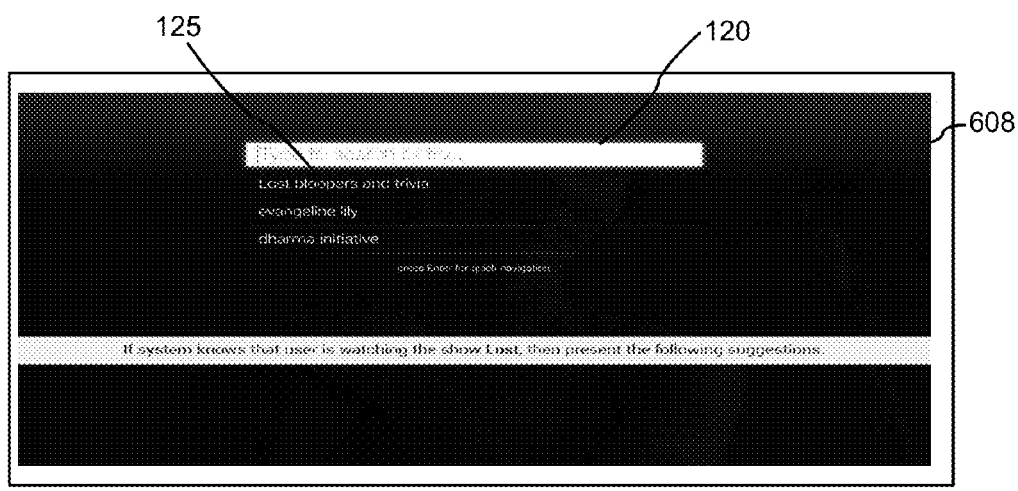

FIGS. 6A-6C are screen images illustrating example portions of a user interface for providing search suggestions, in accordance with some implementations.

In FIG. 6A, the search interface 602 is an example of a user interface, through which a user associated with the electronic device 102 executes user queries. For example, this is done by the user entering one or more search terms in the search field 120. In some implementations, the search interface 602 display information ("Type to search or try") informing a user that they may begin a search by entering one or more search terms in the search field 120.

In FIG. 6B, the search interface 606 is an example of a user interface, in which a suggested search feature is displayed. For example, in the search interface 606, suggested search feature "Try romantic comedies with tom hanks" is displayed in the search field 604 before a user enters any search terms in the search field 120. The suggested search feature "Try romantic comedies with tom hanks" informs a user that search terms such as "comedies" and "tom hanks" can be connected using a Boolean connector "with" to produce search results for comedies starred by tom hanks.

In FIG. 6C, the search interface 608 is an example of a user interface, in which suggested search terms are displayed. For example, in the search interface 608, suggested search terms related to a Lost episode a user is watching on a Google TV, such as "Lost bloopers and trivia," "evangeline lily," and "dharma initiative," are displayed in the suggestion list 125.

Plural instances may be provided for components, operations or structures described herein as a single instance. Finally, boundaries between various components, operations, and data stores are somewhat arbitrary, and particular operations are illustrated in the context of specific illustrative configurations. Other allocations of functionality are envisioned and may fall within the scope of the implementation(s). In general, structures and functionality presented as separate components in the example configurations may be implemented as a combined structure or component. Similarly, structures and functionality presented as a single component may be implemented as separate components. These and other variations, modifications, additions, and improvements fall within the scope of the implementation(s).

It will also be understood that, although the terms "first," "second," etc. may be used herein to describe various elements, these elements should not be limited by these terms. These terms are only used to distinguish one element from another. For example, a first predefined period could be termed a second predefined period, and, similarly, a second predefined period could be termed a first predefined period, which changing the meaning of the description, so long as all occurrences of the "first predefined period" are renamed consistently and all occurrences of the "second predefined period" are renamed consistently. The first predefined period, and the second predefined period are both predefined periods, but they are not the same predefined period.

The terminology used herein is for the purpose of describing particular implementations only and is not intended to be limiting of the claims. As used in the description of the implementations and the appended claims, the singular forms "a", "an" and "the" are intended to include the plural forms as well, unless the context clearly indicates otherwise. It will also be understood that the term "and/or" as used herein refers to and encompasses any and all possible combinations of one or more of the associated listed items. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "if" may be construed to mean "when" or "upon" or "in response to determining" or "in accordance with a determination" or "in response to detecting," that a stated condition precedent is true, depending on the context. Similarly, the phrase "if it is determined (that a stated condition precedent is true)" or "if (a stated condition precedent is true)" or "when (a stated condition precedent is true)" may be construed to mean "upon determining" or "in response to determining" or "in accordance with a determination" or "upon detecting" or "in response to detecting" that the stated condition precedent is true, depending on the context.

The foregoing description included example systems, methods, techniques, instruction sequences, and computing machine program products that embody illustrative implementations. For purposes of explanation, numerous specific details were set forth in order to provide an understanding of various implementations of the inventive subject matter. It will be evident, however, to those skilled in the art that implementations of the inventive subject matter may be practiced without these specific details. In general, well-known instruction instances, protocols, structures and techniques have not been shown in detail.

The foregoing description, for purpose of explanation, has been described with reference to specific implementations. However, the illustrative discussions above are not intended to be exhaustive or to limit the implementations to the precise forms disclosed. Many modifications and variations are possible in view of the above teachings. The implementations were chosen and described in order to best explain the principles and their practical applications, to thereby enable others skilled in the art to best utilize the implementations and various implementations with various modifications as are suited to the particular use contemplated.

What is claimed is:

1. A method comprising:
at an electronic device having an associated display, one or more processors, and memory storing one or more programs for execution by the one or more processors:
displaying on the display a user interface including a search field;
before a user enters a query into the user interface, detecting a predefined user activity relating to the search field over a first time period, wherein the predefined user activity is user inactivity;
in response to detecting the predefined user activity over the first time period and in accordance with a determination that the first time period is at least a first predefined amount of time, displaying on the display one or more search suggestions, the search suggestions comprising a suggested search feature demonstrating syntax of a system-supported user query;
after displaying the search suggestions, detecting the predefined user activity relating to the search filed over a second time period distinct from the first time period; and
in response to detecting the predefined user activity over the second time period and in accordance with a determination that the second time period is at least a second predefined amount of time, wherein the second predefined amount of time is greater than the first predefined amount of time, displaying the search suggestions again.

2. The method of claim 1, further comprising:
receiving, from the search field, a user query having one or more characters,
wherein the first character of the suggested search feature is the same as the first character of the user query.

3. The method of claim 1, wherein the suggested search feature is displayed in the search field; and further comprising:
receiving, from the search field, the user query; and
displaying, in a suggestion list, the suggested search feature when the first character of the suggested search feature is the same as the first character of the user query.

4. The method of claim 1, wherein the suggested search feature is a search feature randomly selected from a plurality of suggested search features.

5. The method of claim 1, wherein the suggested search feature is selected in accordance with (a) a time, day or date associated with the user query or the user's recent viewing activity; or (b) a search history or a user profile associated with the user.

6. The method of claim 5, wherein the user query or the user's recent viewing activity is transmitted to a server, and the suggested search feature is selected by the server.

7. The method of claim 1, wherein the suggested search feature is a search feature unknown or infrequently used by the user.

8. The method of claim 1, further comprising:
in response to the detection, prior to displaying the one or more search suggestions:
transmitting information identifying user activities at the electronic device, including the detected predefined user activity relating to the search field, to a server; and
receiving the one or more search suggestions from the server, wherein the search suggestions are determined by the server in accordance with the transmitted information.

9. The method of claim 1, wherein the suggested search feature is a search feature selected in accordance with a determination that the search feature has not been displayed to the user ever before or has not been displayed to the user for at least a third predefined amount of time.

10. The method of claim 1, wherein the suggested search feature is a search feature selected in accordance with a determination that the search feature was released to availability to users within a fourth predefined amount of time.

11. An electronic device, comprising:
an associated display;
one or more processors;
memory; and
one or more programs, wherein the one or more programs are stored in the memory and configured to be executed by the one or more processors, the one or more programs including instructions for:
displaying on the display a user interface including a search field;
before a user enters a query into the user interface, detecting a predefined user activity relating to the search field over a first time period, wherein the predefined user activity is user inactivity;
in response to detecting the predefined user activity over the first time period and in accordance with a determination that the first time period is at least a first predefined amount of time, displaying on the display one or more search suggestions, the search suggestions comprising a suggested search feature demonstrating syntax of a system-supported user query;
after displaying the search suggestions, detecting the predefined user activity relating to the search filed over a second time period distinct from the first time period; and in response to detecting the predefined user activity over the second time period and in accordance with a determination that the second time period is at least a second predefined amount of time, wherein the second predefined amount of time is greater than the first predefined amount of time, displaying the search suggestions again.

12. The electronic device of claim 11, wherein the one or more programs further comprising instructions for:
receiving, from the search field, a user query having one or more characters,
wherein the first character of the suggested search feature is the same as the first character of the user query.

13. The electronic device of claim 11, wherein the suggested search feature is displayed in the search field; and wherein the one or more programs further comprising instructions for:
receiving, from the search field, the user query; and
displaying, in a suggestion list, the suggested search feature when the first character of the suggested search feature is the same as the first character of the user query.

14. The electronic device of claim 11, wherein the suggested search feature is one of: (i) a search feature randomly selected from a plurality of suggested search features, or (ii) a search feature that has not been displayed to the user for a predefined period of time in the past.

15. A non-transitory computer readable storage medium storing one or more programs, the one or more programs comprising instructions, which when executed by a computer system with one or more processors and an associated display, cause the computer system to:
display on the display a user interface including a search field;
before a user enters a query into the user interface, detect a predefined user activity relating to the search field over a first time period, wherein the predefined user activity is user inactivity;
in response to detecting the predefined user activity over the first time period and in accordance with a determination that the first time period is at least a first predefined amount of time, display on the display one or more search suggestions, the search suggestions comprising a suggested search feature demonstrating syntax of a system-supported user query;
after displaying the search suggestions, detect the predefined user activity relating to the search filed over a second time period distinct from the first time period; and
in response to detecting the predefined user activity over the second time period and in accordance with a determination that the second time period is at least a second predefined amount of time, wherein the second predefined amount of time is greater than the first predefined amount of time, display the search suggestions again.

16. The non-transitory computer readable storage medium of claim 15, wherein the one or more programs further comprising instructions for:
receiving, from the search field, a user query having one or more characters,
wherein the first character of the suggested search feature is the same as the first character of the user query.

17. The non-transitory computer readable storage medium of claim 15, wherein the suggested search feature is displayed in the search field; and wherein the one or more programs further comprising instructions for:
receiving, from the search field, the user query; and
displaying, in a suggestion list, the suggested search feature when the first character of the suggested search feature is the same as the first character of the user query.

* * * * *

UNITED STATES PATENT AND TRADEMARK OFFICE
CERTIFICATE OF CORRECTION

PATENT NO. : 9,292,622 B2
APPLICATION NO. : 13/728951
DATED : March 22, 2016
INVENTOR(S) : Chandel et al.

It is certified that error appears in the above-identified patent and that said Letters Patent is hereby corrected as shown below:

In the claims,

Claim 1, column 15, line 52, please delete "search filed" and insert --search field--;

Claim 11, column 16, line 64, please delete "search filed" and insert --search field--;

Claim 15, column 18, line 9, please delete "search filed" and insert --search field--.

Signed and Sealed this
Seventh Day of June, 2016

Michelle K. Lee
*Director of the United States Patent and Trademark Office*